Sept. 15, 1953      C. H. SCHETZER      2,651,944
FOOTREST FOR AUTOMOTIVE VEHICLE DRIVERS
Filed Nov. 28, 1949
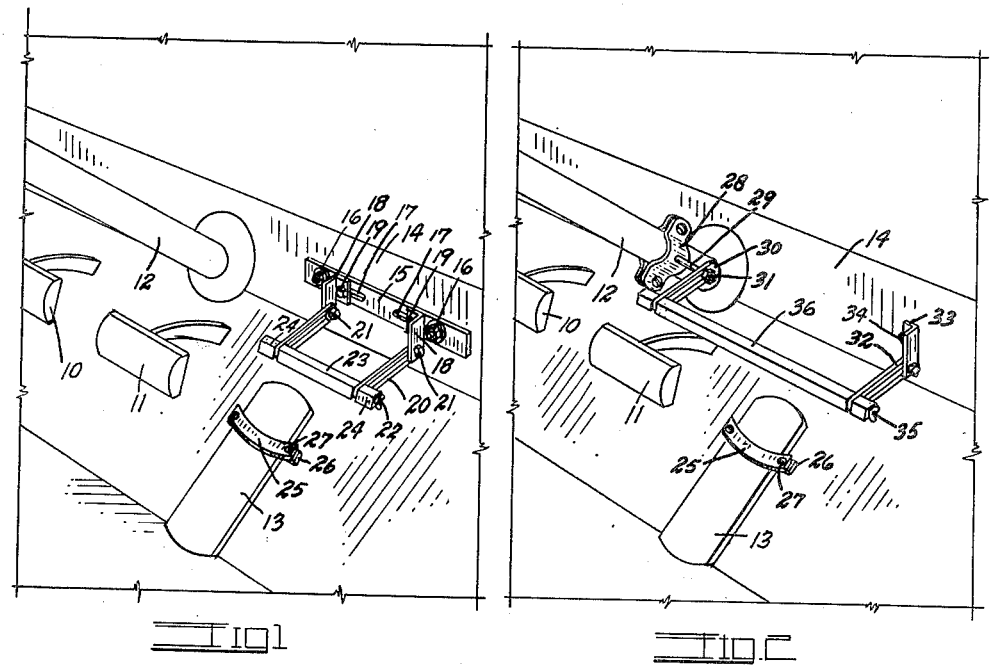
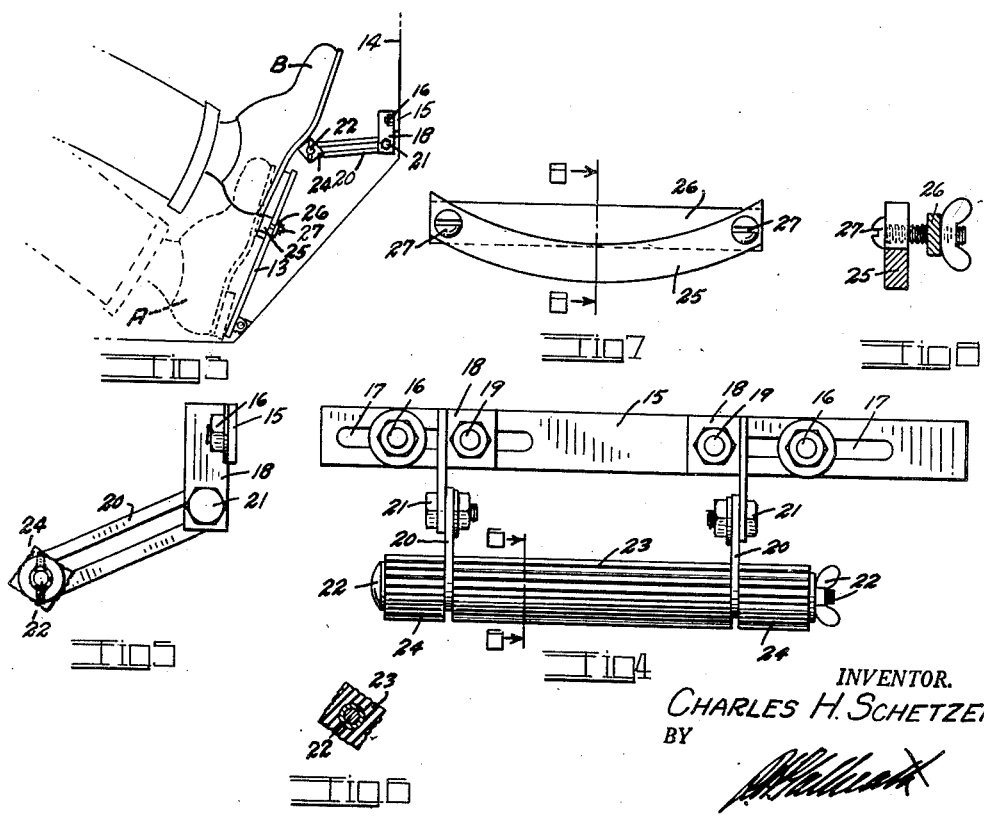
INVENTOR.
CHARLES H. SCHETZER
BY
ATTORNEY Patented Sept. 15, 1953

2,651,944

UNITED STATES PATENT OFFICE 2,651,944

FOOTREST FOR AUTOMOTIVE VEHICLE DRIVERS

Charles H. Schetzer, Goodland, Kans.

Application November 28, 1949, Serial No. 129,809

1 Claim. (Cl. 74—564)

This invention relates to a foot rest for the accelerator pedal of an automotive vehicle. In the usual automotive vehicle, it is necessary to hold the accelerator pedal depressed with the toe of the foot at all driving speeds. On long drives this results in great fatigue of the foot and leg muscles. The principal object of this invention is to provide a simple and convenient foot rest which can be easily installed over the accelerator pedal of any automotive vehicle which will enable the foot to be moved upwardly unto the rest so that the heel can be used for depressing the pedal, thus, creating two positions for the foot which will relieve and rest the latter.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary, perspective view illustrating the pedal portion of an automotive vehicle with one form of the invention in place thereon;

Fig. 2 is a similar view illustrating a second form of the invention;

Fig. 3 is a side view of the improved accelerator foot rest illustrating the positions of the foot thereon;

Fig. 4 is a front view of the improved rest;

Fig. 5 is a side view thereof;

Fig. 6 is a detail cross-section, taken on the line 6—6, Fig. 4;

Fig. 7 is a front view of a heel rest used with the improved foot rest; and

Fig. 8 is a cross-section through the heel rest, taken on the line 8—8, Fig. 7.

In the drawing, the clutch pedal of an automotive vehicle is indicated at 10, the brake pedal at 11, the steering post at 12, the accelerator pedal at 13, and the firewall at 14.

In the first form of the improved foot rest, a supporting bar 15 is mounted on the firewall of the vehicle by means of suitable attachment studs 16. The studs 16 pass through elongated slotted openings 17 in the bar 15 so that the latter is adjustable transversally thereon. Two angle brackets 18 are attached to the bar 15 by means of suitable attachment screws 19. The screws 19 also pass through the slotted openings 17.

A slotted supporting arm 20 is secured to each angle bracket 18 by means of suitable clamp bolts 21. The arms 20 support a suitable rest rod 22 which extends throughout the length of a tubular, rectangular rubber foot rest formed in three sections, a center section 23 and two end sections 24.

The device as thus far described is used in connection with a heel rest, as illustrated in Figs. 7 and 8. The heel rest consists of a curved heel rest bar 25 of sufficient length to extend across the accelerator pedal 13 and project beyond the sides of the latter. The bar 25 is clamped to the accelerator pedal by means of a transversally extending clamping strap 26 which is secured to the bar 25 at its extremities by means of clamp screws 27. The curve of the bar substantially conforms to the normal curve of the rear of a shoe heel.

The bar 25 is secured on the accelerator pedal at approximately the position shown in Fig. 3 so that the ball of the driver's foot will rest on the foot rest 23. The position of the foot rest can be varied by moving the foot rest rod 22 in the slotted arms upwardly and downwardly about the bolts 21 and by shifting the supporting bar 15 along the attachment studs 16 to provide the most comfortable and convenient position for the foot rest.

The usual driving position is indicated in broken line at "A" in Fig. 3. When this position becomes tiresome, the driver can shift his foot to the position "B" of Fig. 3 so that the pedal 13 will be depressed by the heel of the foot instead of the toe. Thus, the leg muscles can be conveniently and frequently rested during long drives to avoid tiring and cramping of the muscles.

A second method of installing the improved foot rest is illustrated in Fig. 2 in which a bolt actuated clamp 28 is secured to the steering post 12. The clamp is provided with a projecting stud 29 to which a slotted arm 30 is secured by means of a clamping nut 31. A second slotted arm 32 is secured to the firewall of the vehicle by means of an angle clip 33 and attachment bolt 34. A foot rest rod 35 extends between the arms 30 and 32. The rod is surrounded by a rectangular rubber foot rest 36 which serves the same purpose as the previously described foot rests 23 and 24.

While the rubber portions of the foot rests 23, 24, and 36 have been illustrated and described as rectangular, they could, of course, have any other suitable cross-section, such as triangular, and are preferably corrugated, as shown in Fig. 4, to prevent the foot from slipping.

The heel bar 25 is adjustable longitudinally of the pedal 13 to accommodate differing sizes of shoes. In addition to the longitudinal adjustment provided by the slotted arms 20 and the bolts 21, additional longitudinal adjustment is provided by loosening the rest rod 22 so that it may slid in the slotted arms for adjustment.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A foot rest for use with the accelerator pedal of an automotive vehicle of the type having a fire wall and a steering post, comprising: a screw-actuated clamp adapted to be clamped about said steering post; an angle clip; means for securing said clip to said fire wall; a threaded stud projecting from said screw-actuated clamp; a first arm pivotally mounted at its one extremity on said stud; a second arm pivotally mounted at its one extremity on said angle clip; a foot rest rod substantially longer than said arms secured to and extending between the other extremities of said arms; and screw fastening means for securing said arms at any desired angle relative to the stud and the angle clip so as to support the ball of a user's foot while his heel rests upon said accelerator pedal.

CHARLES H. SCHETZER.

References Cited in the file of this patent

UNITED STATES PATENTS

| Number | Name | Date |
|---|---|---|
| 512,869 | Curtis | Jan. 16, 1894 |
| 646,943 | Bailey | Apr. 10, 1900 |
| 652,066 | White | June 19, 1900 |
| 1,276,189 | Diety | Aug. 20, 1918 |
| 1,410,351 | Stanwood | Mar. 21, 1922 |
| 1,613,237 | Meyer | Jan. 4, 1927 |
| 1,698,140 | Maud | Jan. 8, 1929 |
| 1,706,003 | Swain | Mar. 19, 1929 |
| 1,898,640 | Moss | Feb. 21, 1933 |
| 1,986,555 | Carlson | Jan. 1, 1935 |
| 2,174,876 | Garrison | Oct. 3, 1939 |
| 2,283,600 | Dodson | May 19, 1942 |
| 2,524,486 | Snow | Oct. 3, 1950 |
| 2,567,529 | Schetzer | Sept. 11, 1951 |

FOREIGN PATENTS

| Number | Country | Date |
|---|---|---|
| 16,422 | Australia | Nov. 6, 1929 |